US 6,984,414 B2

(12) United States Patent
Miyata (10) Patent No.: US 6,984,414 B2
(45) Date of Patent: Jan. 10, 2006

(54) PROCESS OF FORMING A UNIAXIALLY ORIENTED MESOSTRUCTURED FILM ON A UNIAXIALLY ORIENTED POLYMER COMPOUND

(75) Inventor: Hirokatsu Miyata, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 10/670,256

(22) Filed: Sep. 26, 2003

(65) Prior Publication Data

US 2005/0249878 A1  Nov. 10, 2005

Related U.S. Application Data

(62) Division of application No. 09/657,616, filed on Sep. 8, 2000.

(30) Foreign Application Priority Data

Sep. 10, 1999 (JP) .................................. 11-257351
Sep. 5, 2000 (JP) ............................ 2000-0268617

(51) Int. Cl.
   *B05D 5/00* (2006.01)
(52) U.S. Cl. .................................... 427/243; 427/407.1
(58) Field of Classification Search ................ 427/243, 427/402, 407.1
   See application file for complete search history.

(56) References Cited

U.S. PATENT DOCUMENTS

| 3,962,205 A | | 6/1976 | Ward et al. .................. 526/352 |
| 4,864,008 A | * | 9/1989 | Murata et al. ............... 564/315 |
| 5,622,684 A | * | 4/1997 | Pinnavaia et al. ........... 423/702 |
| 5,827,448 A | * | 10/1998 | Konuma et al. ........ 252/299.61 |
| 6,027,666 A | | 2/2000 | Ozin et al. ............. 252/301.4 R |
| 6,096,469 A | | 8/2000 | Anderson et al. ........... 430/119 |
| 6,120,891 A | | 9/2000 | Balkus et al. ................ 428/336 |
| 6,171,687 B1 | | 1/2001 | Leung et al. ............. 428/304.4 |
| 6,846,546 B2 | * | 1/2005 | Kuroda et al. ............... 428/188 |

| 2005/0019547 A1 | * | 1/2005 | Miyata et al. ........... 428/312.6 |

FOREIGN PATENT DOCUMENTS

JP   09-265097 A  * 10/1997
WO   WO 99/57061 A1 * 11/1999

OTHER PUBLICATIONS

Miyata et al., Alignment of Mesoporous Silica on a Glass Substrate by a Rubbing Method, Chem. Mater. 1999, 11, 1609-1614. Published on Web May 11, 1999.*
Definition of 'polyimide' from Alger's Polymer Science Dictionary, 2nd Edition, Copyright 1989 by Chapman & Hall, 1997 Mark Alger, p. 420.*
"Synthesis of oriented films of mesoporous silica on mica", Hong Yang, et al. ; Nature vol. 379, Feb. 22, 1996, pp. 703-705.
"Ordered mesoporous molecular sieves synthesized by a liquid-crystal template mechanism", C.R. Kresge, et al.; Nature vol. 359, Oct. 22, 1992, pp. 710-712.
"Continuous formation of supported cubic and hexagonal mesoporous films by sol-gel dip-coating", Yunfeng Lu, et al.; Nature vol. 389, Sep. 25, 1997, pp. 364-368.
"Synthesis of Highly Ordered Mesoporous Materials from a Layered Polysilicate", S. Inagaki, et al.; J. Chem. Soc., Commun., 1993, pp. 680-682.
Makoto Ogawa, "A simple sol-gel route for the preparation of silica-surfactant mesostructure materials", Chem. Commun., 1996, pp. 1149 and 1150.
Ogawa et al., "Preparation of Self-Standing . . . Process Silica Films", Adv. Mater. 1998, vol. 10, No. 14, 1077-1080.

* cited by examiner

Primary Examiner—Timothy Meeks
Assistant Examiner—William Phillip Fletcher, III
(74) Attorney, Agent, or Firm—Fitzpatrick, Cella, Harper & Scinto (57) ABSTRACT

An excellent mesostructured thin film, and a process for producing the mesostructured thin film are provided. In the process, the mesostructured thin film having an oriented rod-like pore structure is formed on a surface of a polymer compound containing a sequence of two or more adjacent methylene groups in the repeating unit of the molecule.

1 Claim, 4 Drawing Sheets

← DIRECTION FOR RUBBING

PROCESS OF FORMING A UNIAXIALLY ORIENTED MESOSTRUCTURED FILM ON A UNIAXIALLY ORIENTED POLYMER COMPOUND

This application is a division of copending application Ser. No. 09/657,616, filed Sep. 8, 2000.

BACKGROUND OF THE INVENTION

1. Field of the Invention

The present invention relates to a mesostructured thin film, and a process for producing the mesostructured thin film. In particular, the present invention relates to a mesostructured silica thin film, a mesoporous silica thin film, a process for producing the mesostructured silica thin film, and a process for producing the mesoporous silica thin film.

2. Related Background Art

Porous materials are used in various fields such as adsorption, and separation. According to IUPAC, the porous materials are classified into micorporous materials having a pore diameter of less than 2 nm, mesoporous materials having a pore diameter of 2 to 50 nm, and macroporous materials having a pore diameter of more than 50 nm. Known microporous materials include zeolites such as natural aluminosilicates and synthetic aluminosilicates, and metal phosphates. These porous materials are employed for selective adsorption, shape-selective catalytic reactions, molecular-sized reactors, and so forth by utilizing the fine pore size.

Known microporous crystalline materials have pore diameters of not more than about 1.5 nm. A solid having a larger pore diameter is demanded for adsorption and reaction of bulkier compounds not adsorbable by the micropore. As the materials having the larger pores, there are known silica gels, pillared clays, and the like. However, these materials have a broad pore size distribution, and the pore size cannot readily be controlled.

With such a background, two methods have been disclosed at about the same time for synthesizing mesoporous silica having mesopores of a uniform size arranged in a honeycomb shape. The one method synthesizes a material called MCM-41 by hydrolysis of a silicon alkoxide in the presence of a surfactant (Nature, vol. 359, p. 710). The other method synthesizes a material called FSM-16 by intercalation of an alkylammonium in interlaminar spaces of kanemite, a kind of layered polysilicate (Journal of Chemical Society, Chemical Communications, vol. 1993, p. 680). In both methods, it is considered that surfactant assembly acts as structure-directing agent of mesostructured silica. These substances are useful as a catalyst for bulky molecules which cannot enter the pores of zeolite, and are promising in application as a functional material such as optical materials and electronic materials.

In application of such a mesoporous material having a regular porous structure as a functional material other than catalysts, the technique for uniformly holding the material on a substrate is important. The method for forming a uniform mesoporous thin film on a substrate includes a spin coating method as shown in Chemical Communications, vol. 1996, p. 1149, and a dip coating method as shown in Nature, vol. 389, p. 364, and a deposition method of forming a film on the surface of a solid material by deposition as shown in Nature, vol. 379, p. 703.

SUMMARY OF THE INVENTION

The present invention intends to provide an improved mesostructured thin film. The present invention intends also to provide a process for producing the improved mesostructured thin film.

The process for producing a mesostructured thin film having an oriented rod-like pore structure of the present invention comprises the step of forming the mesostructured thin film on a surface of a polymer compound containing a sequence of two or more adjacent methylene groups in a molecular structure of the repeating unit of the polymer compound.

The process may comprise the step of preparing the surface of the polymer compound, preferably forming a polymer compound film having the polymer compound surface on a base plate.

The step of forming the polymer compound surface may be the formation of a Langmuir-Blodgett film.

The mesostructured thin film is formed on the surface of the polymer compound which has orientation. The orientation is preferably uniaxial.

The mesostructured thin film contains silicon, more specifically silica. Preferably the mesostructured silica thin film is formed by hydrolyzing a silicon alkoxide.

The mesostructured thin film may be formed by hydrolyzing a material for the mesostructured thin film in the presence of a surfactant. The surfactant may be a quaternary alkylammonium, or a surfactant containing a polyethylene oxide as the hydrophilic group.

The process may comprise the step of removing the surfactant after the formation of the mesostructured thin film. By the removal of the surfactant, the mesostructured thin film can readily be made porous to produce an excellent mesoporous thin film.

The removal of the surfactant may be conducted by baking the mesostructured thin film, or by solvent-extraction of the surfactant.

The mesostructured thin film is formed by hydrolyzing a material for the mesostructured thin film, preferably in an acidic condition.

The mesostructured thin film is formed by bringing a solution containing a material for the mesostructured thin film into contact with a surface of the polymer compound, specifically by holding the substrate having a polymer compound surface in a solution.

The surface of the polymer compound is preferably subjected to rubbing treatment before the formation of the mesostructured thin film. Preferably the rubbing treatment is conducted to have orientation, especially uniaxial orientation, to the polymer compound surface. The rubbing treatment is conducted in a direction perpendicular to the mesochannel of the mesostructured thin film to be formed.

The number of a sequence of adjacent methylene groups in the repeating unit of the polymer compound preferably ranges from 2 to 20.

The sequence of the adjacent methylene groups in the repeating unit of the polymer compound may be contained either in the main chain or the side chain of the polymer compound.

The mesostructure preferably has a pore structure, and more preferably the pores in the mesostructure are oriented.

The above constitutions may be combined.

In another embodiment of the present invention, a mesostructured thin film having an oriented rod-like pore structure is provided which is formed on a polymer compound containing a sequence of two or more adjacent methylene groups in a molecular structure of the repeating unit of the polymer compound.

The surface of the polymer compound may be a surface of a Langmuir-Blodgett film of the polymer compound.

The polymer compound is preferably oriented, more preferably uniaxially oriented.

The mesostructured thin film contains silicon, specifically silica. The mesostructured thin film is formed preferably by hydrolyzing a silicon alkoxide.

The mesostructured thin film is formed preferably by hydrolysis reaction in the presence of a surfactant.

The mesostructured thin film preferably has a hollow structure.

The surface of the polymer compound is subjected preferably to rubbing treatment before the formation of the mesostructured thin film.

The rubbing treatment is conducted preferably in a direction perpendicular to mesochannels of the mesostructured thin film to be formed.

The number of a sequence of adjacent methylene groups in the repeating unit of the polymer compound preferably ranges from 2 to 20.

The sequence of adjacent methylene groups in the repeating unit of the polymer compound may be contained either in the main chain or the side chain of the polymer compound.

The mesostructure preferably has a pore structure, and more preferably the pores are oriented.

DETAILED DESCRIPTION OF THE PREFERRED EMBODIMENTS

Conventional methods for producing a mesoporous thin film have disadvantages below. The mesostructure of a film formed by spin coating does not have a directional configuration throughout the entire film, so that the pore can not be oriented. The mesostructure of a film formed by deposition on a substrate depends greatly on the properties of the substrate. For the formation of an oriented film by deposition, the substrate is limited to those having order at an atomic level like a cleavage plane of mica or graphite.

There has been required a technique for the formation of the oriented mesoporous thin film on any substrate. A method to satisfy this requirement is disclosed in Chemistry of Materials, vol. 11, p. 1609. In this method, a substrate is coated with a thin film of a polymer compound on the surface thereof and the thin film is subjected to rubbing treatment.

The examples below show mesostructured thin films and mesoporous thin films, formed on a substrate with a simple process, which are oriented, and highly continuous and uniform, and a process for producing the thin films.

The present invention is described below in detail.

As an embodiment of the present invention, a process for producing a mesostructured silica thin film, and a silica mesostructure produced by this process are explained below. In the process, using a substrate comprising a polymer compound film that has been subjected to a rubbing treatment formed on the surface thereof, a mesostructured silica thin film is formed on the substrate held in a solution by hydrolysis of a silicon alkoxide under acidic conditions in the presence of a surfactant, wherein the polymer compound has a repeating unit containing a sequence of two or more adjacent methylene groups.

As another embodiment of the present invention, a process for producing a mesostructured silica thin film and a silica mesostructure produced by this process are explained below. In the process, using a substrate comprising a Langmuir-Blodgett film of a polymer compound formed on the surface thereof, a mesostructured silica thin film is formed on the substrate held in a solution by hydrolysis of a silicon alkoxide under acidic conditions in the presence of a surfactant, wherein the polymer compound has a repeating unit containing a sequence of two or more adjacent methylene groups.

In the aforementioned two processes, a mesostructured silica thin film excellent in uniformity, continuity, and uniaxial orientation can be obtained when the polymer compound has a sequence of adjacent methylene groups the number of which ranges from 2 to 20 in the repeating unit. The adjacent methylene groups in the repeating unit of the polymer compound may be contained either in the main chain or in the side chain of the polymer compound. The methylene groups contained in the main chain of the polymer compound tends to improve uniaxial orientation, whereas the methylene groups in the side chain tends to improve the continuity of the thin film formed thereon.

In a second invention of the present application, one embodiment provides a process for producing a hollow mesoporous silica thin film by removing the surfactant from the mesostructured silica thin film formed as described above, and the mesoporous silica thin film produced by the process. The removal of the surfactant is usually conducted by baking, or solvent extraction. However, the method of the removal is not limited thereto, provided that the surfactant can be removed without destroying the mesostructure of the fine pores.

The embodiments of the present invention are explained below.

Figure 2:
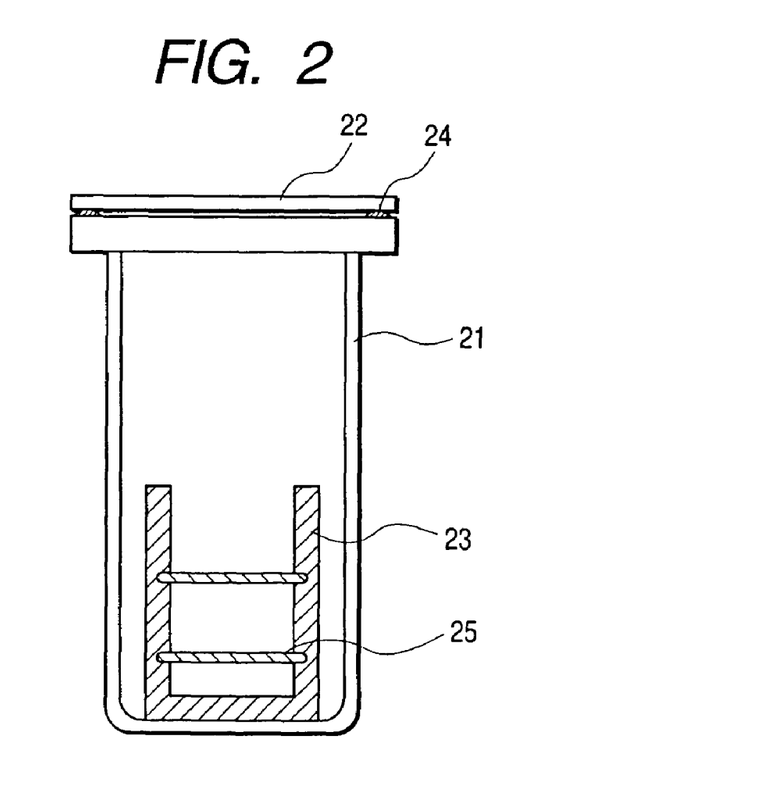
FIG. 2 is an explanatory drawing of a reactor for forming a silica mesocomplex thin film of the present invention.

FIG. 2 is an explanatory drawing of an example of the reactor for forming a silica mesostructured thin film of the present invention. The material consisting of the reactor 21 is not specially limited, provided that the material is resistant against chemicals, especially acids, including polypropylene and polyfluoroethylene (commercial name: TEFLON. As shown in FIG. 2, for example, an acid-resistant substrate holder 23 is placed in the reactor 21 to hold a substrate 25. A lid 22 made of TEFLON or a like material seals the reactor with a seal 24 like an O-ring. In FIG. 2, the substrate 25 is held horizontally, but is not limited thereto.

Figure 3A:
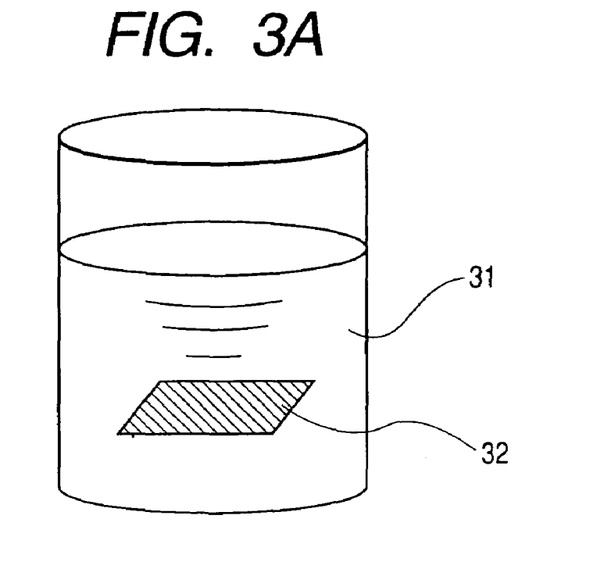
FIGS. 3A and 3B are respectively an explanatory drawing showing the method of holding the substrate in a reaction solution.
Figure 3B:
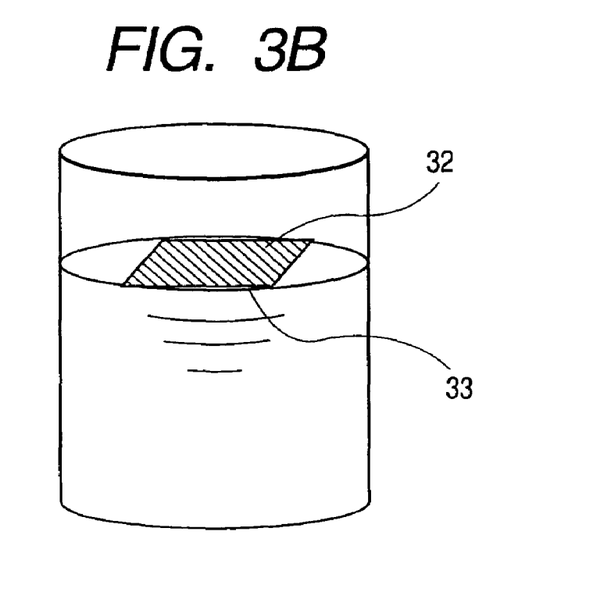

FIGS. 3A and 3B show the method of holding the substrate in a reaction solution. Generally, as shown in FIG. 3A, the substrate 32 is held in a reaction solution 31. However, the substrate 32 may be held on the surface of the reaction solution with the face 33 having been treated for orientation brought into contact with the surface of the reaction solution to form a similar film. The reactor may be protected by a closed vessel made of a material of high rigidity against destruction by the pressure during the reaction.

For use in FIG. 2 and FIGS. 3A and 3B, the reaction solution is an aqueous mixture solution of an alkoxide of silicon such as tetraethoxysilane and a surfactant of which pH is adjusted to lower than 2 (the isoelectric point of $SiO_2$) by mixing an acid such as hydrochloric acid. The surfactant is suitably selected from cationic surfactants such as quaternary alkylammonium salts, and nonionic surfactants having a hydrophilic group such as alkylamine and polyethylene oxide. The length of the molecule of the surfactant is selected suitably depending on the intended pore diameter of the mesostructure. An additive such as mesitylene may be added for increasing the micelle diameter of the surfactant.

The $SiO_2$ precipitate is formed at a lower rate under acidic conditions, especially near the isoelectric point thereof, although the precipitate is formed instantaneously under basic conditions on addition of the alkoxide.

The substrate employed in the present invention has a thin film of a polymer compound formed thereon and subjected to rubbing treatment. The base material for the substrate for forming the polymeric film is not specially limited, the material including silica glass, ceramics, and resins.

The rubbing treatment is conducted by rubbing with cloth the polymer coat having been formed on a substrate by spin coating or a like coating method. Usually, the rubbing cloth is wound on a roller, and the rotating roller is pushed against the surface of the substrate.

The polymer compound for forming the thin film on the surface of the substrate has the repeating unit containing a sequence of two or more adjacent methylene groups. When the repeating unit has the adjacent methylene groups the number of which ranges from 2 to 20, the film formed will give a mesostructured silica thin film of excellent uniaxial orientation. It is considered that, within this range of the number of the methylene groups, the orientation of the polymer compound imparted by the rubbing is not lost by the elevated reaction temperature in deposition of the mesostructured silica thin film mentioned later.

The specific examples of the polymer compound suitable for the rubbing treatment are polyimides.

The thickness of the polymer compound thin film is preferably in the range of from 1 to 20 nm, more preferably from 3 to 10 nm.

According to the present invention, the uniaxial orientation of the silica mesostructure can be obtained also by using a Langmuir-Blodgett film (LB film) of a polymer compound in place of the rubbing-treated polymer compound thin film. The LB film is prepared by transferring a monomolecular film spread on a water surface onto a substrate. A desired number of layers of the film can be obtained by repeating the layer formation. The LB film in the present invention includes built-up monomolecular films formed on a substrate and heat-treated to change the chemical structure thereof with the built-up structure maintained.

Figure 4:
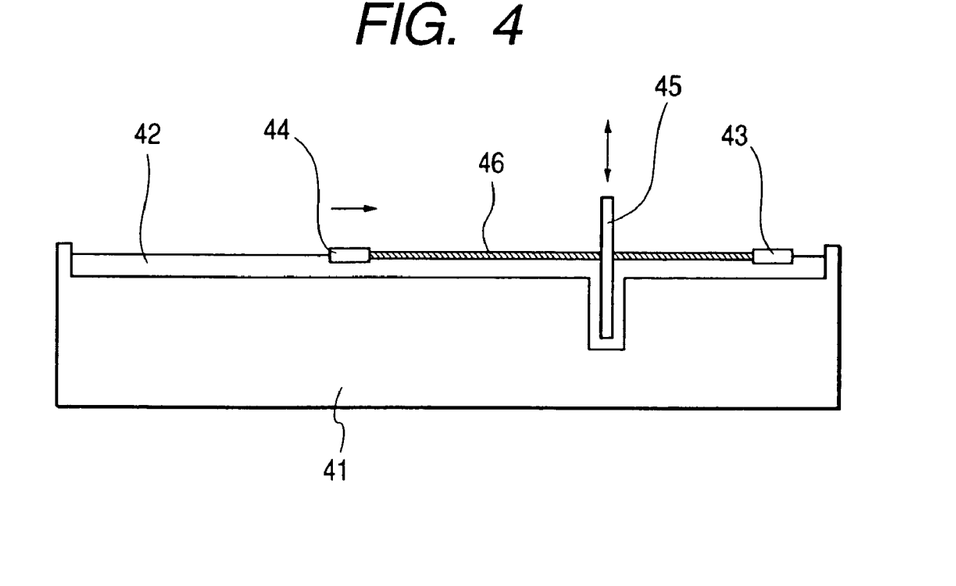
FIG. 4 is a schematic drawing of an LB film forming system employed in the present invention.

The LB film may be formed by a conventional method. FIG. 4 shows schematically a conventional LB film formation system. In FIG. 4, a water tank 41 is filled with pure water 42. The water tank has a fixed barrier 43 equipped with a surface pressure sensor not shown in the drawing. A monomolecular layer 46 is formed by dropping a solution containing the objective substance or the precursor thereof onto the water surface region between the fixed barrier 43 and a movable barrier 44. A surface pressure is applied by moving the movable barrier 44. The movable barrier 44 is controlled positionally by the surface pressure sensor to apply a prescribed surface pressure during the film formation on the substrate. The fresh pure water is incessantly fed by a water supply apparatus and a water discharge apparatus not shown in the drawing. A cavity is provided in a portion of the water tank 41, where a base plate 45 is held. The base plate 45 is driven upward and downward at a constant speed by a driving mechanism not shown in the drawing. The film on the water surface is transferred onto the base plate during the downward movement of the base plate into water and during the upward movement from the water.

The LB film employed in the present invention is formed, layer by layer, on the base plate with such a system by transferring the monomolecular layer formed on the water surface by the downward and upward movement of the base plate with application of a surface pressure. The condition and the properties of the film are controlled by the surface pressure, the rate of downward and upward movement of the base plate, and the number of the layers. The surface pressure during the film formation is selected to be optimum from the surface area/surface pressure curve, generally ranging from several mN/m to several ten mN/m. The rate of movement of the substrate is generally ranges from several mm/min to several hundred mm/min. The LB film is generally formed by the method described above. However, the LB film in the present invention is not limited thereto, and may be prepared by utilizing flow of the subphase water.

The base plate for the LB film is not specially limited in its material, but is preferably stable against an acid. The useful material for the base plate includes silica glass, ceramics, and resins.

The polymer compound for the LB film in the present invention contains a sequence of two or more adjacent methylene groups in the repeating unit similarly as the compound for the rubbing-treated polymer compound thin film. The LB film formed from the compound having 2 to 20 adjacent methylene groups will give a mesostructured silica thin film of excellent uniaxial orientation. The polymer compound having a sequence of more than 20 adjacent methylene groups in the repeating unit has a lower uniaxial orientation. It is considered that, with a larger number of the methylene groups, the orientation of the polymer compound of the LB film is lost at the elevated reaction temperature in deposition of the mesostructured silica thin film.

The polymer compound suitable for formation of the LB film is exemplified by an alkylamine salt of a polyamic acid, which is heated to form a polyimide LB film on the base plate.

The thickness of the LB film ranges preferably from 1 to 20 nm, more preferably from 2 to 10 nm.

The mesostructured silica can be deposited on a substrate on the aforementioned conditions. The deposition temperature is not specially limited, but is selected preferably in the temperature range from room temperature to about 100° C. The reaction time ranges from several hours to several months. The shorter the reaction time, the thinner will be the formed film.

The film formed in such a manner on a substrate is washed with pure water and is air-dried to obtain a silica mesocomplex thin film.

From this silica mesocomplex thin film, a mesoporous silica thin film is prepared by removing the template surfactant micelle. The removal of the surfactant can be conducted by baking or solvent extraction. For example, the surfactant can be removed completely by baking the mesostructured thin film at 550° C. in the air for 10 hours almost without destroying the mesostructure and the uniaxial orientation thereof. Otherwise, solvent extraction is employed for formation of a mesoporous thin film on a substrate material nonresistant to baking, although the surfactant cannot be removed completely by the solvent extraction.

The gist of the present invention as described above is as follows. Firstly, the continuity of the film can be improved by increasing the hydrophobicity of the polymer compound formed on the base plate and increasing the deposition density of the mesoporous silica particles on the rubbing-treated polymer compound thin film or on the LB film. Secondly, a film of highly uniaxial orientation can be prepared by strengthening the interaction between the alkyl groups on the substrate surface and the alkyl groups of the surfactant molecules.

The present invention is described below in more detail by reference to Examples.

EXAMPLE 1

In this Example, a silica mesocomplex thin film and a mesoporous silica thin film were formed on a substrate having a coat of a polymer compound thin film containing a sequence of six adjacent methylene groups in the repeating unit in the main chain of the polymer compound and having been subjected to rubbing treatment.

A silica glass plate for the substrate was washed with acetone, isopropyl alcohol, and pure water successively, and was cleaned with the surface in an ozone generating apparatus. On this plate, a solution of polyamic acid A in NMP was applied by spin coating, and the coated matter was baked at 200° C. for one hour to form a polyimide A having the structure below:

(A)

The thin film was treated with rubbing under the condition shown in Table 1 to prepare the substrate for the mesocomplex silica thin film.

TABLE 1

| Rubbing Condition of Polyimide A | |
|---|---|
| Cloth material | Nylon |
| Roller diameter (mm) | 24 |
| Pushing depth (mm) | 0.4 |
| Rotation rate (rpm) | 1000 |
| Stage speed (mm/min) | 600 |
| Rotation repetition | 2 |

In 108 mL of pure water, was dissolved 2.82 g of cetyltrimethylammonium chloride. Thereto, 48.1 mL of 36% hydrochloric acid was added. The mixture was stirred for two hours to prepare an acidic surfactant solution. To this solution, 1.78 mL of tetraethoxysilane (TEOS) was added, and the solution was stirred for 2 minutes and 30 seconds. This solution was transferred into a teflon vessel containing the aforementioned substrate as shown in FIG. 2 to hold the substrate in the solution. This solution contained totally $H_2O$, HCl, cetyltrimethylammonium chloride, and TEOS at a molar ratio of 100:7:0.11:0.10. This vessel was closed with a lid, and the vessel was placed in a stainless container. The container was placed in an oven kept at 80° C. for 24 hours.

Then the substrate that had been in contact with the reaction solution for a predetermined time period was taken out from the vessel, washed sufficiently with pure water, and air-dried at room temperature.

Figure 5:
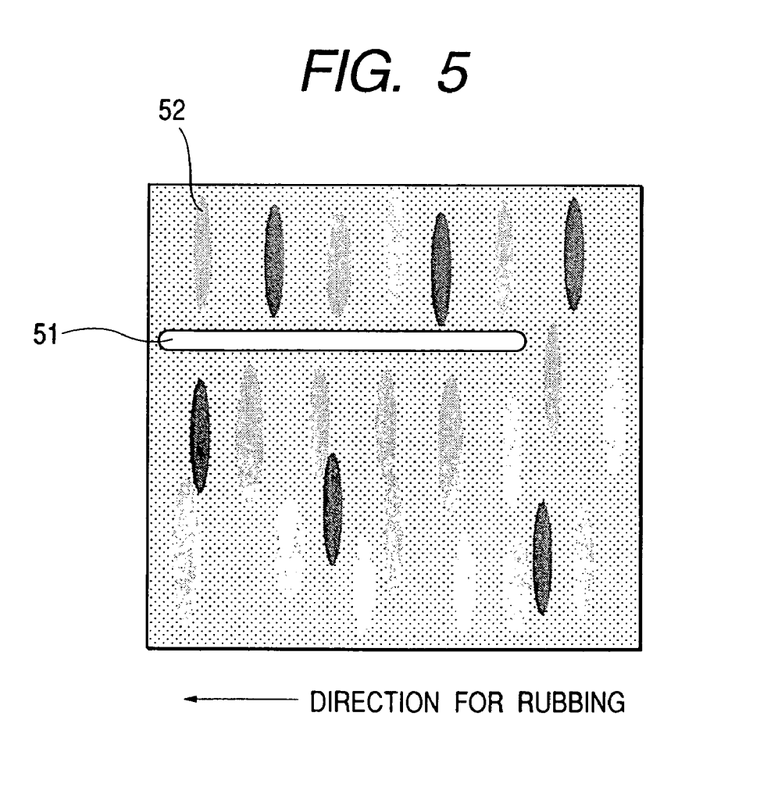
FIG. 5 is a schematic drawing of a microscopic image of a thin film formed by the reaction for 24 hours in Example 1 of the present invention.

The dried substrate after contact with the reaction solution for 24 hours was examined by an optical microscopy. FIG. 5 shows schematically the observed morphology. As shown in FIG. 5, on the substrate having an oriented polyimide film A that has been subjected to rubbing treatment, an almost continuous film was formed which has a structure 52 of long and narrow domains oriented uniaxially perpendicularly to the rubbing direction. On this polyimide, the film formed under the conditions of this Example had a few defects 51 in a streak shape parallel to the rubbing direction as shown in FIG. 5.

This mesostructured silica thin film was observed by X-ray diffraction analysis to confirm an major diffraction peak assigned to the (100) plane of a hexagonal structure having an interplanar spacing of 3.60 nm. Thereby this thin film was confirmed to have a hexagonal pore structure. The absence of diffraction peak in the wide angle region shows that the silica constituting the wall is amorphous.

The uniaxial orientation of the mesochannel of the mesostructured silica thin film was evaluated quantitatively by in-plane X-ray diffraction analysis.

The direction of the mesochannel signifies the direction of depth of the pores, and the distribution thereof can be evaluated by in-plane X-ray diffraction analysis. This analysis measures dependency, on in-plane rotation, of the X-ray diffraction intensity caused by the (110) plane perpendicular to the substrate as shown in Chemistry of Materials, vol. 11, p. 1609.

Figure 6:
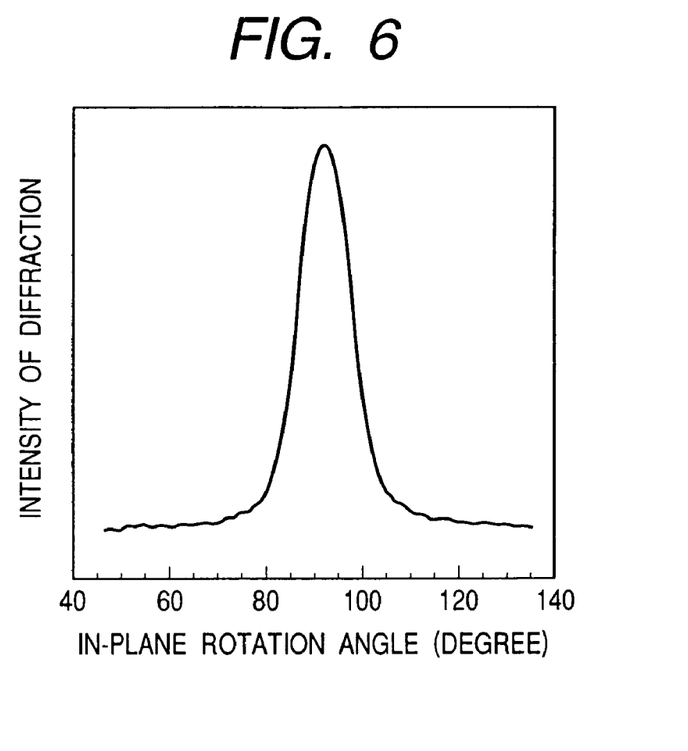
FIG. 6 is a drawing showing dependency of diffraction intensity at (110) plane on the in-plane rotation angle in the in-plane X-ray diffraction analysis of the silica mesostructured thin film formed in Example 1 of the present invention.

In the X-ray diffraction in this Example, two peaks were observed with an interval of 180°, showing the orientation of the pores of the mesostructured silica. FIG. 6 shows the dependency of the (110) plane diffraction intensity on the in-plane rotation angle in this Example with the direction of the rubbing taken as 0° of the in-plane rotation angle. As in FIG. 6, the profile is of Gaussian type with the center at 90°. This shows that, in the mesostructured silica thin film prepared in this Example, the mesochannels are oriented to be perpendicular to the rubbing direction with the half width of the distribution of the orientation direction being about 13°.

The substrate having the mesostructured silica thin film was baked in a muffle furnace at a heating rate of 1° C./min up to 550° C. for 10 hours. The baking caused no significant change of the surface condition of the substrate. The X-ray diffraction analysis of the baked thin film gave an intense diffraction peak at the interplanar spacing of 3.44 nm, showing the retention of the hexagonal pore structure. After the baking, no diffraction peak was observed in the wide angle region, which shows that the silica of the wall was kept amorphous. The sample after the baking was confirmed not to contain organic components coming from the surfactant by infrared absorption spectrum.

The mesoporous silica thin film after the baking was subjected to in-plane X-ray diffraction analysis to determine the dependency of the (110) plane diffraction intensity on the in-plane rotation angle. As the result, a profile similar to that shown in FIG. 6 was obtained with the half width of about 12°. This shows that the uniaxial orientation of the mesochannel was kept unchanged after the baking.

Figure 1:
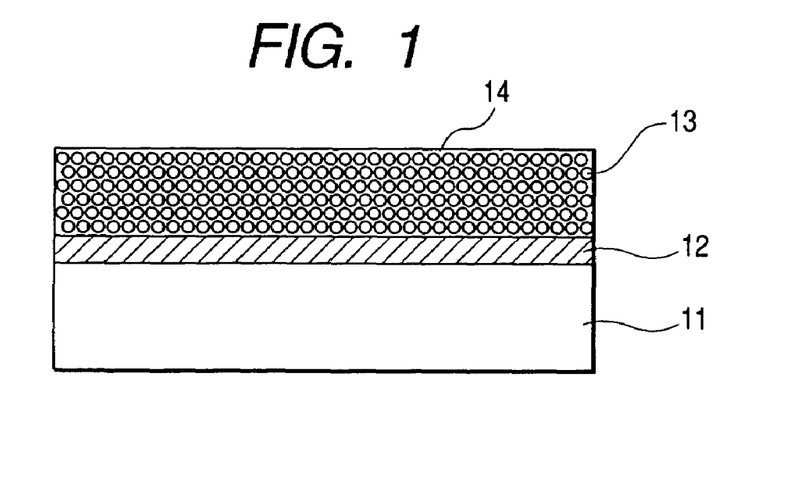
FIG. 1 is a schematic drawing of a TEM image of an oriented silica mesocomplex thin film or a mesoporous thin film prepared in Example 1 of the present invention.

The thin film before the baking and the thin film after the baking were cut in the direction parallel to the rubbing direction by means of focused ion beam (FIB), and the sectional faces were observed by transmission type electron microscopy. In both of the films, the presence of pores of the hexagonal structure was observed, and the orientation of the mesopores were confirmed to be oriented perpendicularly to the rubbing direction. FIG. 1 shows schematically the cross section of the silica mesocomplex thin film taken in the direction perpendicular to the rubbing direction. In FIG. 1, the numeral 11 denotes a silica glass base plate; 12, a rubbing-treated oriented film; 13, micelles of a surfactant in a rod shape, or pores; and 14, silica.

The baking treatment improves the adhesion of the mesoporous thin film to the substrate. Thereby, after the baking, the mesoporous silica film was not exfoliated even by hard rubbing of the surface with cloth. This is considered to be due to the formation of partial bonding of the mesoporous silica layer to the underlaying silica by dehydration condensation of silanol.

EXAMPLE 2

In this Example, mesoporous silica was prepared by removing a surfactant from a silica mesocomplex formed on a substrate.

On a silica glass base plate, polyimide A was formed, and the polyimide A was subjected to rubbing treatment in the same manner as in Example 1. Thereon, a mesostructured silica thin film was formed with the solution of the same composition and in the same procedure as in Example 1.

This mesostructured silica thin film was immersed in ethanol at 70° C. for 24 hours for extraction. With this one extraction treatment, 90% or more of the surfactant was removed from the synthesized silica mesostructure. The same extraction treatment was repeated twice, thereby 95% or more of the surfactant being removed. The thin film after the extraction was dried to remove the ethanol to obtain mesoporous silica.

The solvent extraction for the revomal of surfactant micelles employed in this Example is effective for removing the surfactant from a silica mesocomplex thin film formed on a substrate having less resistance to heat treatment in an oxidative atmosphere, although the solvent extraction is not suitable for complete removal of the surfactant.

The formed mesoporous silica thin film was subjected to in-plane X-ray diffraction analysis as in Example 1 to determine the uniaxial orientation of the mesochannel in the thin film from the in-plane rotation dependency of (110) plane diffraction intensity. The obtained profile had the same half width as that before the surfactant extraction. This shows that the mesoporous silica thin film could be obtained also by the solvent extraction with the uniaxial orientation retained.

EXAMPLE 3

In this Example, a silica mesocomplex thin film, and a mesoporous silica thin film were formed on a substrate having a coat of a polymer compound thin film containing a sequence of 17 adjacent methylene groups in the repeating unit in the side chain of the polymer compound and having been subjected to rubbing treatment.

On a silica glass plate having been preliminarily treated as in Example 1, a solution of polyamic acid B in NMP was applied by spin coating, and the coated matter was baked at 180° C. for one hour to form a polyimide B having the structure below:

(B)

The thin film was subjected to rubbing treatment under the condition shown in Table 2.

TABLE 2

| Rubbing Condition of Polyimide B | |
| --- | --- |
| Cloth material | Nylon |
| Roller diameter (mm) | 24 |
| Pushing depth (mm) | 0.6 |
| Rotation rate (rpm) | 1000 |
| Stage speed (mm/min) | 600 |
| Rotation repetition | 2 |

This substrate was put into a reaction solution having the same composition as in Example 1, and the reaction vessel was placed in an oven kept at 80° C. for 24 hours. Then the substrate was taken out from the vessel, washed sufficiently with pure water, and air-dried at room temperature.

The dried substrate after contact with the reaction solution for 24 hours was observed by optical microscopy to confirm orientation of the texture. However, the orientation of the texture was unclear in comparison with that observed in Example 1. The orientation direction of the texture in the mesostructured silica prepared in this Example was parallel to the rubbing direction, being different from that in Example 1. The mesostructured silica thin film prepared in this Example was completely continuous, and does not have defects like that in Example 1.

This mesostructured silica thin film was observed by X-ray diffraction analysis to find a major diffraction peak assigned to the (100) plane of a hexagonal structure having an interplanar spacing of 3.58 nm. Thereby this thin film was confirmed to have a hexagonal pore structure. The absence of diffraction peak in the wide angle region shows that the silica constituting the wall is amorphous.

The uniaxial orientation of the mesochannel of the mesostructured silica thin film was evaluated quantitatively by in-plane X-ray diffraction analysis as in Example 1. Thereby the dependency of the (110) plane diffraction intensity on the in-plane rotation angle was measured. Taking the rubbing direction as the in-plane rotation angle 0°, the profile is of Gaussian type with the center at 0° with the half width of about 35°. This shows that, in the mesostructured silica thin film prepared in this Example, the mesochannel is oriented nearly parallel to the rubbing direction.

The substrate having the mesostructured silica thin film was baked under the same condition as in Example 1. The baking caused no significant change of the surface condition of the substrate. The X-ray diffraction analysis of the baked thin film gave an intense diffraction peak at the interplanar spacing of 3.44 nm, showing the retention of the hexagonal pore structure. After the baking, no diffraction peak was observed in the wide angle region, which shows that the silica of the wall was kept amorphous. The sample after the baking was confirmed not to contain organic components coming from the surfactant by infrared absorption spectrum.

The mesoporous silica thin film given by the baking was subjected to in-plane X-ray diffraction analysis to determine the dependency of the (110) plane diffraction intensity on the in-plane rotation angle. As the result, a profile was of a Gaussian curve with the half width of about 34°. This shows that the mesostructured silica prepared in this Example retained the uniaxial orientation of the mesochannel after the baking. The baking improves the adhesion of the mesostructured thin film to the substrate in this Example.

COMPARATIVE EXAMPLE 1

In this Comparative Example, a silica mesocomplex thin film, and a mesoporous silica thin film were formed on a substrate having a coat of a polymer compound thin film having no methylene group in the repeating unit of the polymer compound and having been subjected to rubbing treatment.

On a silica glass plate having been treated in the same manner as in Example 1, a solution of polyamic acid C in NMP was applied by spin coating, and the coated matter was baked at 200° C. for one hour to form a polyimide C having the structure below:

(C)

The thin film was subjected to rubbing treatment under the condition shown in Table 3.

TABLE 3

| Rubbing Condition of Polyimide C | |
|---|---|
| Cloth material | Nylon |
| Roller diameter (mm) | 24 |
| Pushing depth (mm) | 0.4 |
| Rotation rate (rpm) | 1000 |
| Stage speed (mm/min) | 600 |
| Rotation repetition | 2 |

This substrate was put into a reaction solution of the same composition as in Example 1, and the reaction vessel was placed in an oven kept at 80° C. for 24 hours. Then the substrate was taken out from the vessel, washed sufficiently with pure water, and air-dried at room temperature.

Figure 7:
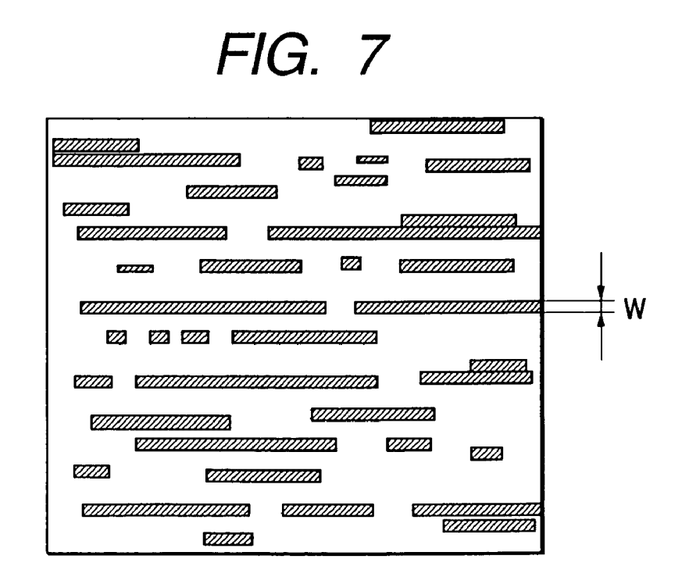
FIG. 7 is a schematic drawing of a microscope image of a thin film formed by the reaction for 24 hours in Comparative Example 1.

The mesostructured silica thin film prepared in this Comparative Example was observed by optical microscopy. Thereby, long and narrow particles of mesostructured silica were uniaxially oriented in the rubbing direction. The particles are in most portions in a scattered state, although distributed continuously in part to form films. FIG. 7 shows schematically the optical microscope image of the mesostructured silica formed on the substrate in this Comparative Example. In FIG. 7, the breadth w of the individual particle was in the range from about 2 μm to about 3 μm. The X-ray diffraction pattern of this sample had a diffraction peak assigned to the (100) plane of the hexagonal structure at the position corresponding to the interplanar spacing of 3.60 nm, showing the formation of the same structure as the mesostructure obtained in Example 1 on the substrate.

The mesochannel was found to be curved at the end portions of the individual particles shown in FIG. 7, so that the uniaxial orientation of the mesostructured silica prepared in the Comparative Example is inferior as a whole.

EXAMPLE 4

In this Example, a silica mesocomplex thin film, and a mesoporous silica thin film were formed on a substrate coated with an LB film formed from the polyimide A employed in Example 1.

Polyamic acid A and N,N-dimethylhexadecylamine were mixed at a molar ratio of 1:2 to form a salt of N,N-dimethylhexadecylamine salt of the polyamic acid A. This salt was dissolved in N,N-dimethylacetamide to form a 0.5 mM solution. This solution was dropped onto a surface of water kept at 20° C. in an LB film forming apparatus. The monomolecular film formed on the water surface was transferred onto a base plate with application of a constant surface pressure of 30 mN/m at a base plate dipping speed of 5.4 mm/min.

The employed base plate was a silica glass plate which had been washed with acetone, isopropyl alcohol, and pure water successively and subjected to surface cleaning in an ozone generator for hydrophobicity. An LB film of 30 layers of the alkylamine salt of the polyamic acid was formed on the base plate. The LB film was baked in a nitrogen gas flow at 300° C. for 30 minutes to form an LB film of polyimide A. Imidation by cyclodehydration of polyamic acid and elimination of alkylamine were checked by infrared spectroscopy.

This obtained substrate was put into a reaction solution having the same composition as in Example 1, and the reaction vessel was placed in an oven kept at 80° C. for 24 hours. Then the substrate was taken out from the vessel, washed sufficiently with pure water, and air-dried at room temperature.

The mesostructured silica thin film formed in this Example was observed by optical microscopy. Thereby, it was found that a continuous film was formed which had the same texture as that of the thin film prepared in Example 1. The orientation of the texture was in a direction perpendicular to the base plate pull-up direction. The formed mesostructured silica thin film has a few defects in this case also. However, the defects were less than that in the film prepared in Example 1. The method of this Example could give a mesostructure silica thin film having high continuity in comparison with the method in which a substrate is prepared by forming a film by spin coating on a base plate and the formed film is rubbed, although the formation of an LB film requires much labor.

This mesostructured silica thin film was observed by X-ray diffraction analysis to find a major diffraction peak assigned to the (100) plane of a hexagonal structure having an interplanar spacing of 3.58 nm. Thereby this thin film was confirmed to have a hexagonal pore structure. The absence of diffraction peak in the wide angle region shows that the silica constituting the wall is amorphous.

The uniaxial orientation of the mesochannel of the mesostructured silica thin film was evaluated quantitatively by in-plane X-ray diffraction analysis as in other Examples. Thereby the dependency of the (110) plane diffraction intensity on the in-plane rotation angle was measured. Taking the base plate pull-up direction in the LB film formation as the in-plane rotation angle 0°, the profile is of Gaussian type with the center at 90° with the half width of about 12°. This shows that, in the mesostructured silica thin film formed on the LB film of polyimide A in this Example, the mesochannel is oriented perpendicularly to the direction of the movement of the base plate.

The substrate having the mesostructured silica thin film was baked under the same conditions as in Example 1 to remove the surfactant. The baking caused no significant change in the morphology of the film. The X-ray diffraction analysis of the baked thin film gave an intense diffraction peak at the interplanar spacing of 3.42 nm, showing the retention of the hexagonal pore structure. After the baking, no diffraction peak was observed in the wide angle region, which shows that the silica of the wall was kept amorphous. The sample after the baking was confirmed not to contain organic components coming from the surfactant by infrared absorption spectrum.

The mesoporous silica thin film given by the baking was subjected to in-plane X-ray diffraction analysis to determine the dependency of the (110) plane diffraction intensity on the in-plane rotation angle. As the result, a profile had a half width of about 12°. This shows that the mesostructured silica prepared in this Example retained the uniaxial orientation of the mesochannel after the baking.

EXAMPLE 5

In this Example, a mesostructured silica thin film and a mesoporous silica thin film having pores of uniaxially oriented two-dimensional hexagonal structure were formed on a substrate coated with oriented polyimide A film and subjected to rubbing treatment as in Example 1, using a surfactant having polyethylene oxide group as the hydrophilic group.

On a silica glass plate, a thin film of polyimide A was formed with the same polyamic acid and in the same manner as in Example 1. This thin film was subjected to rubbing treatment in the same manner as in Example 1 under the conditions shown in Table 1 to obtain the substrate for mesostructured silica formation.

5.52 g of polyoxyethylene dodecyl ether ($C_{12}H_{25}$ $(CH_2CH_2O)_{10}OH$, $C_{12}EO_{10}$) was dissolved in 129 mL of pure water. Thereto, 20.6 mL of concentrated hydrochloric acid (36%) was added, and further to the solution, 2.20 mL of tetraethoxysilane (TEOS) was added. The mixture was stirred for 3 minutes. The total molar ratio of the constituents in the solution of TEOS, $H_2O$, HCl, and $C_{12}EO_{10}$ was 0.1:100:3:0.11.

The above substrate having the rubbing-treated polyimide A film was held in the above reaction solution with the film-coated face directed downward. The vessel containing the reaction solution was closed tightly. The reaction was allowed to proceed at 80° C. for three days. During the reaction, the surface was covered via a spacer to obtain an excellent uniaxially oriented mesostructured silica thin film.

After the contact of the substrate with the reaction solution for the prescribed time, the substrate was taken out from the reaction vessel, washed with pure water sufficiently, and dried in the air at room temperature. A continuous film of mesostructured silica was confirmed to be formed on the substrate.

This film was examined by X-ray diffraction analysis to find a major diffraction peak corresponding to interplanar spacing of 4.30 nm assigned to the (100) plane of mesostructured silica. This thin film had a pore structure in which rod-like pores are packed hexagonally.

The uniaxial orientation of the mesochannel of the mesostructured silica thin film was also evaluated quantitatively by in-plane X-ray diffraction analysis. From the dependency of the (110) plane diffraction intensity on the in-plane rotation angle, in the mesostructured silica thin film prepared in this Example, the mesochannel is oriented perpendicularly to the rubbing direction with the orientation direction distribution with the half width of about 20°.

As described above, a uniaxially oriented mesostructured silica thin film was confirmed to be formed on the substrate even by use of the nonionic surfactant having polyethylene oxide as the hydrophilic group.

The mesostructured silica thin film was immersed in ethanol and the ethanol was refluxed at 70° C. for 24 hours to remove the surfactant from the pores in the mesostructured silica. This operation was repeated twice. Thereby, 96% or more of the surfactant could be removed from the pores. The thin film after the removal of the surfactant was analyzed by in-plane X-ray diffraction to determine the distribution of pore direction. A mesoporous silica thin film was confirmed to be formed with the complete retention of the uniaxially orientation with the half width of about 20°.

The use of a nonionic surfactant having polyethylene oxide as the hydrophilic group makes it possible to control the pore diameter in a wide range in comparison with the use of an alkylammonium type of cationic surfactant.

As shown in the above Examples, a mesocomplex thin film, and a mesoporous thin film can be formed with high continuity and high uniaxial orientation on the substrate which has a thin film of a polymer compound having a sequence of two or more adjacent methylene groups in the repeating unit and has been subjected to rubbing treatment, or on the substrate which has an LB film of a polymer compound having a sequence of two or more adjacent methylene groups in the repeating unit.

According to the present invention, an excellent mesostructured thin film can be realized and produced.

What is claimed is:

1. A process for producing a mesostructured film having an uniaxially oriented rod-shaped pore structure, comprising the step of forming the mesostructured film on a polymer compound containing a sequence of two or more adjacent methylene groups in a molecular structure of the repeating unit of the polymer compound wherein the surface of the polymer compound is uniaxially oriented by a rubbing treatment conducted in a direction perpendicular to mesochannels of the mesostructured film to be formed, before the formation of the mesostructured film.

* * * * *